United States Patent [19]

Weiss

[11] 3,945,128

[45] Mar. 23, 1976

[54] DYNAMIC VERTICAL ANGLE SENSOR

[75] Inventor: Mitchell Weiss, Palos Verdes, Calif.

[73] Assignee: Hughes Aircraft Company, Culver City, Calif.

[22] Filed: Aug. 30, 1974

[21] Appl. No.: 502,120

[52] U.S. Cl. .................................. 33/366; 33/391
[51] Int. Cl.² ............................................ G01C 9/06
[58] Field of Search ...... 33/366, 391, 401; 318/489, 318/648

[56] References Cited

UNITED STATES PATENTS

| | | | |
|---|---|---|---|
| 3,135,900 | 6/1964 | Smith | 318/489 X |
| 3,184,662 | 5/1965 | Wallace | 318/489 X |
| 3,835,546 | 9/1974 | Jaquet | 33/366 X |

Primary Examiner—Richard E. Aegerter
Assistant Examiner—Charles E. Phillips
Attorney, Agent, or Firm—W. H. MacAllister; Walter J. Adam

[57] ABSTRACT

A dynamic vertical angle sensor operable on a vehicle that isolates the output device from the vehicle movement in that the rotor of the output data device is not directly coupled to the sensor mounting frame. The output rotor is driven by a low pass servo that is slaved to a level sensor, which in itself is driven by the same servo until it is nulled. The level sensor which may be a pendulum, is mounted free from the output device so as to rotate independently therefrom, thus allowing the error signal to be picked off of the pendulum mounting and applied to the low pass servo system. Because a low pass filter is in series with the servo drive, high frequency disturbances are greatly attenuated in the output device, to effectively provide a DC average angle signal that is required, for example, in a tank system, rather than instantaneous values.

5 Claims, 7 Drawing Figures

DYNAMIC VERTICAL ANGLE SENSOR

BACKGROUND OF THE INVENTION

1. Field of the Invention

This invention relates to angle sensors and particularly to an averaging type dynamic vertical angle sensor.

2. Description of the Prior Art

A conventional method of measuring moving vehicle roll requires a vertical gyro having two axes, and which is found to be substantially suitable in an aircraft environment where instantaneous vehicle roll and/or pitch information is required, even during prolonged high g (gravity) maneuvers. However, for certain types of vehicles such as tank vehicles or small ships, for example, only the filtered or averaged cant angle is desired because the instantaneous angle when utilized such as for firing computations may provide a substantial error. Because low frequency high g maneuvers are not possible with these types of systems, an inertial reference system is not required. Another type of vertical sensor that has been used for stationary vehicles is a pendulous static cant sensor in which the pendulum and the output device are attached to the frame of the vehicle. However, this pendulous type has been found to be unsuitable for fire control of moving vehicles, because the pendulum responds instantaneously to vehicle disturbances. It would be a substantial advantage to the art to have a simplified and reliable vertical sensor that would provide an average value of the angle with a high degree of accuracy.

SUMMARY OF THE INVENTION

An improved dynamic cant or vertical angle sensor is providing that includes a pendulum which is driven to a mean vertical position by a servo responding in a selected filtered fashion. The rotor of the output data device is sufficiently decoupled from the sensor frame so as to provide an average rather than an instantaneous output signal. The output device is driven by a low pass servo system that is slaved to a pickoff at the level sensor pendulum which in turn is driven by the same servo until it is in the mean vertical position. Because the electrical signal from the pickoff device generates the servo error signal, only an uncalibrated level sensor is required. The servo system having a low pass filter in series with the servo drive greatly attenuates high frequency disturbances of the pendulum so that a DC average angle signal is provided at the output device.

It is therefore an object of this invention to provide a simplified and improved single-axis vertical angle sensor.

It is a further object of this invention to provide a dynamic cant or roll sensor operable under the severe shock and vibration environment experienced by certain types of vehicles such as tanks.

It is another object of this invention to provide a noninstantaneous dynamic cant or roll sensor that provides a filtered average cant angle either as a shaft position or as an electrical signal substantially suppressing the effect of high frequency perturbations.

It is still another object of this invention to provide an improved cant angle sensor operable with a moving vehicle such as a tank to provide an average roll and roll rate signal with a single axis and without utilizing a gyro.

BRIEF DESCRIPTION OF THE DRAWINGS

These and other objects, features and advantages of the invention itself, will become apparent to those skilled in the art in the light of the following detailed description taken in consideration with accompanying drawings wherein like reference numerals indicate like corresponding parts throughout the several parts wherein.

DESCRIPTION OF THE PREFERRED EMBODIMENT

Figure 1:
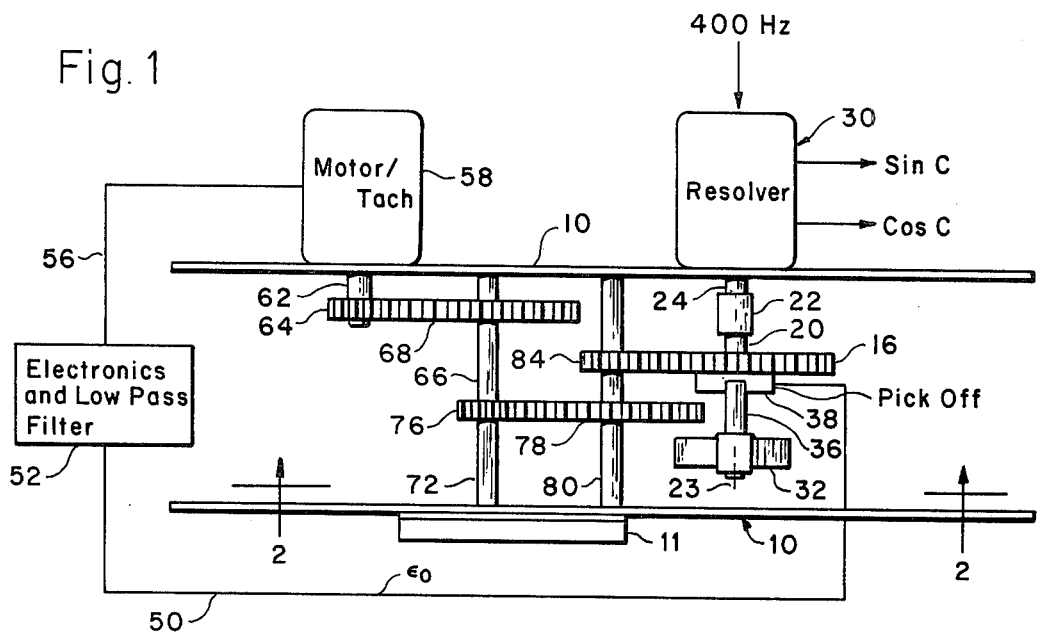
FIG. 1 is a schematic structural and block diagram showing a top view of the dynamic cant or roll angle sensor in accordance with the invention.
Figure 2:
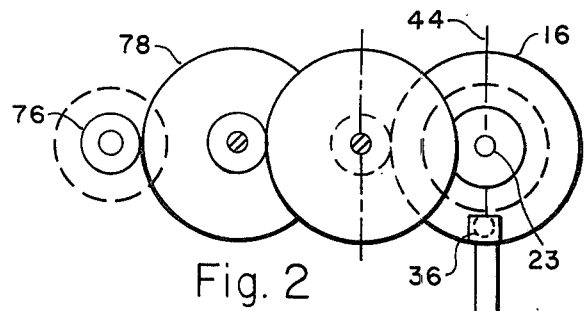
FIG. 2 is a schematic structural block diagram showing the dynamic angle sensor in accordance with the invention from a side view taken at lines 2—2 of FIG. 1.

Referring first to FIGS. 1 and 2, the dynamic vertical angle sensor in accordance with the invention is mounted on a frame 10 which in turn may be fixedly mounted to the frame of a suitable vehicle such as a tank indicated as vehicle frame 11. The sensor includes a first gear 16 which for example, may have a plus or minus 20° angle of rotation and may be mounted on a shaft 20 which is coupled fixedly as far as rotation goes to a shaft 24 through a coupler unit 22. The sensor measures the roll angle around an axis 23 of the shaft 20. The shaft 24 may be coupled to the rotor or rotors of an output unit 30 which, for example, is illustrated as a resolver. The stator of the resolver 30 is fixedly mounted to the frame 30 and moves with the roll or cant of the vehicle. The vertical angle sensor means 32 which may be a pendulum is mounted at a position or pivot axis on the gear structure 16 offset radially from the central axis along the vertical reference axis by a shaft 36 that is fixedly mounted to the pendulum 32. The shaft 36 is also rotatably mounted to the rotor of pickoff structure 38 the latter of which has a stator fixedly mounted to the gear 16. The structure 38 includes an electrical pickoff such as a linear transformer for providing a signal representing the relative angle between the axis 42 of the pendulum 32 and the vertical references axis 44 of the gear 16 along a plane orthogonal to the shaft 36. The pickoff unit 38 applies a signal through a lead 50 to an electronics and low pass filter unit 52 which in turn applies a motor control signal through a lead 56 to a motor and tachometer unit 58, the latter having its stator fixedly mounted relative to the frame 10. A shaft 62 of the motor 58 is fixedly mounted to a second gear 64 of a gear train 66 which may be any suitable arrangement for transferring the circular motion from the motor 58 to the gear structure 16. The gear train 66 is illustrated as including a gear 68 meshing with the gear 64 and fixedly mounted to a shaft 72, which shaft is rotatably mounted at its ends to the frame structure 10. A gear 76 is also fixedly mounted to the axle 72 and meshes with a gear 78 in turn fixedly mounted to a shaft 80, the latter being rotatably mounted to the frame 10. A gear 84 is also fixedly mounted to the shaft 80 and meshes with the gear 16 to cause rotation thereof for driving the pickoff rotor to a null or mean vertical position in response to an angle sensed at the pickoff unit 38. It is to be noted that the resolver 30 may be any suitable type such as the illustrated resolver receiving a 400 Hz signal and providing angle signals sin C and cos C, where C is the cant or roll angle of the vehicle 11 about the longitudinal axis of the shaft 36.

Figure 3:
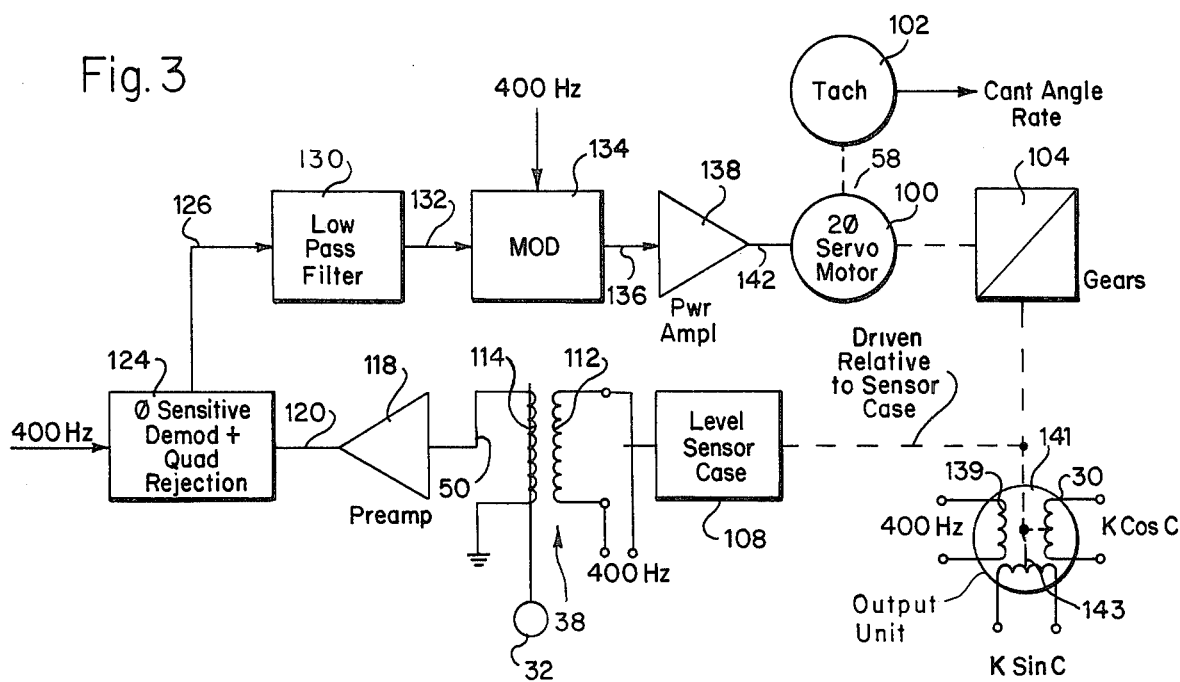
FIG. 3 is a schematic block diagram showing the dynamic and low pass servo loop of the angle sensor in accordance with the invention.

Referring now also to FIG. 3 which shows the loop in further detail, the motor and tachometer unit 58 includes two-phase servo motor 100 receiving a 400 Hz reference signal and mechanically coupled to a tachometer 102 that provides the cant angle rate of change. The gears of the gear train 66 are shown by a gear box 104 mechanically coupled to the shaft of the servo motor 100 and mechanically coupled to output data device 30 which may be a resolver, may be an induction potentiometer or a digital output unit for example. The output of the gear box 104 is coupled to the level sensor case 108 which represents the pendulum 32 and the pickoff unit 38, the latter including for example a first winding 112 being the stator and being fixedly mounted to the gear 16 with ends excited by a 400 Hz reference source. A second winding 114 may be provided with one end connected to ground and the other end connected to the lead 50. The winding 114 is the pendulum rotor and is mounted to the movable structure of the pendulum 32. The lead 50 applies the sensed error signal through a preamplifier 118 to a lead 120, the error signal being an AC signal having an amplitude representative of the angular error from vertical. The AC signal is applied from the lead 120 through a phase sensitive demodulator and quadrature rejector 124 receiving a 400 Hz reference signal and providing a DC error signal to an output lead 126, which signal is then applied to a suitable low pass filter 130. It is to be noted that the filter 130 not only filters out the noise provided by the demodulator but also the high frequency signals resulting from the perturbations and movements of the tank or the instantaneous variations thereof. The signal is applied from the low pass filter 130 through a lead 132 to a modulator 134 receiving a 400 Hz reference signal, and through a lead 136 to a power amplifier 138. A signal is applied from the power amplifier 138 through a lead 142 to the control phase input of the servo motor 100 for driving the motor and in turn the gear train 66 so that pendulum pickoff error signal of the gear 16 is driven to null. It is to be noted that the system of the invention provides a filtered mechanical position as well as a filtered electrical signal or average electrical signal at the output unit 30. The resolver that may be utilized for the output unit 30 includes a 400 Hz reference winding 139 and output windings 141 and 143 respectively providing a signal equal to a constant K times cos C and sin C. The tachometer 102 may provide an angular rate of change signal.

Figure 4:
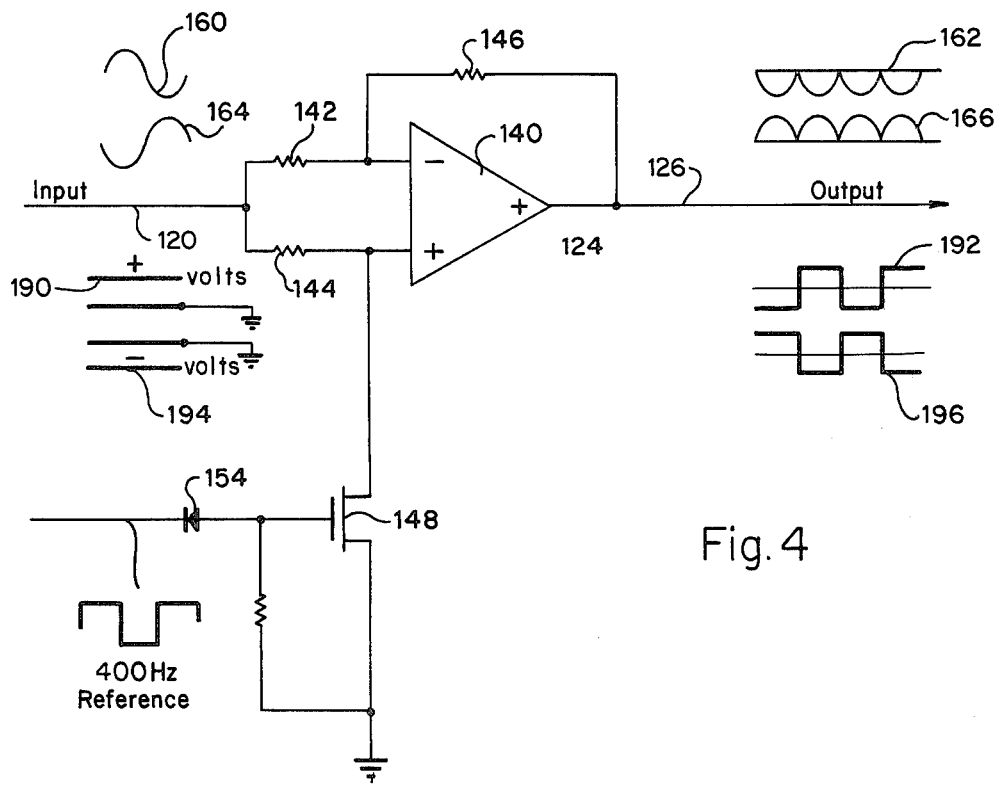
FIG. 4 is a schematic circuit diagram showing a demodulator and modulator that may be utilized in the system of FIG. 1.

Referring now to FIG. 4 the demodulator 124 and the modulator 134 may be any types of unit such as the illustrated arrangement including a high gain amplifier 140 which may be any suitable type such as an LM 107 or a $\mu$ 741, for example. Amplifier negative and positive inputs are coupled through resistors 142 and 144 to the input lead 120 and a resistor 146 is coupled between the negative input terminal and the output lead 126. A switching FET (Field Effect Transistor) 148 is provided with the first terminal coupled to the positive terminal of the amplifier 140, a second terminal coupled to ground and through a resistor to the control terminal, with the control terminal coupled through the anode to cathode path of a diode 152 to a lead receiving the 400 Hz reference signal. In operation, as a demodulator, the FET 148 is periodically switched to provide either an inversion of the AC input signal or to provide a following of the input signal, with the output signal being applied to the output lead 126. Thus, it can be seen that in response to an input signal 160, an output negative rectified signal of a waveform 162 is provided and in response to an input signal of a waveform 164, a positive rectified signal of a waveform 166 is provided. After filtering, the DC level of the output signal 126 can be recovered. This type of circuit is well known in the art and need not be explained in further detail. When the circuit is utilized as the modulator 134, the FET 148 is switched in a manner similar to the demodulator operation. In operation, the positive DC signal of a waveform 190 provides an out of phase square wave of an output waveform 192 and the negative DC signal of waveform 194 provides the in-phase output square wave of a waveform 196. It is to be noted that the square wave output signal on the lead 126 may be passed through a 400 Hz pass filter if a sine wave is desired or may be utilized in a square waveform depending on the characteristics of the servo motor 100.

Figure 5A:
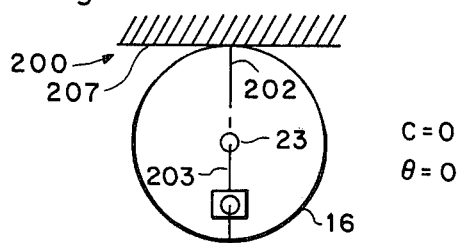
FIGS. 5a, 5b and 5c are schematic diagrams showing the relative positions of the pendulum and the mounting gear for two roll conditions of the vehicle, for further explaining the system operation of the invention.
Figure 5C:
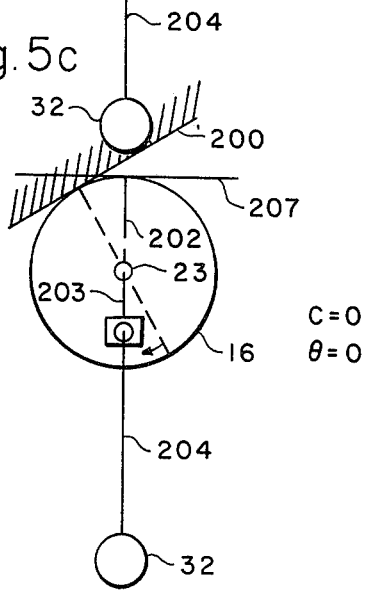
Figure 5B:
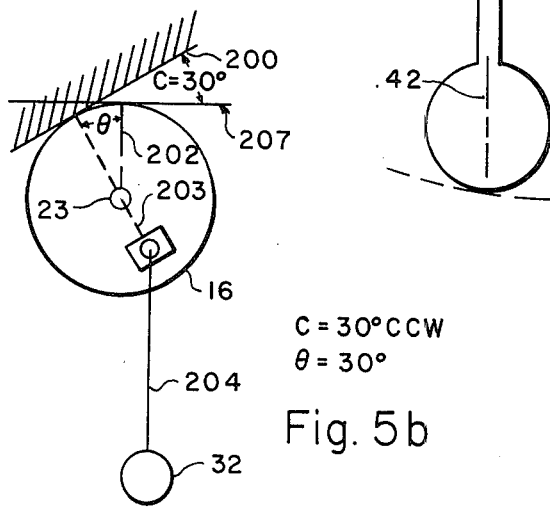

Referring now to FIGS. 5a, 5b and 5c, the operation will be explained in further detail with the gear 16 of FIG. 5a shown in a condition where the cant angle is zero, that is the tank is level as indicated by a line 200 representing a plane through the vehicle error signal $\epsilon_0$ is 0 volts with the pendulum in the vertical position parallel to the vertical reference line 202 of the gear 16. As the vehicle, structure or tank moves, a condition of FIG. 5b may be provided if the tank is at a cant angle C relative to the vertical as shown by the line 200 which is illustrated at 30° above the horizontal with the gear 16 reference line being at an angle $\theta$ of 30° with the vertical. This condition of 5b shows a time prior to that of which the sensor drive of the invention has responded. The error angle $\epsilon_0$ equals a constant ×30° and the pivot axis line 202 is at a 30° angle with the vertical and line 203 through the pendulum axis is vertical. After a certain period of several seconds or the period of the response time of the servo loop of the system, the condition of FIG. 5c is attained when the servo loop has responded to move the gear 16 and pendulum pivot point to a position relative to the pendulum so that the angle $\theta$ equals 0°. The error signal operating through the motor 100 also moves the resolver rotor of the output 30 to a 30° position as the gear 16 is being driven to null the pendulum pickoff error signal on lead 50. Thus, the feedback servo causes the rotor of the resolver to move back 30° which is equal to the cant angle. It is to be noted that the 30° cant angle of the tank from the vertical as shown by the line 200 is representative of the angle of the frame relative to the horizontal plane of a line 207.

Thus, in the system of the invention, the rotor of the output unit is not fixedly attached to the case or the vehicle but is attached to the shaft that is servo driven in response to the pendulum. The servo device responds to an error signal generated by the pendulum movement to provide a rotor motion of the output unit which may, for example, be a resolver. This resolver is decoupled from the instantaneous position of the case and only responds to the error signal as passed through the servo feedback loop. It is to be noted that if the rotor were attached to the case of the output unit, high frequency movements would be sensed and applied to the output leads. Thus, in the device of the invention the output unit only follows movement after selected filtering of the error signal derived from the pendulum so that an average roll angle position drives the output, which is highly desirable for computing for fire control purposes. When utilizing a resolver as the output unit, the rotors do not respond to the high frequency perturbations that effect the pendulum. The dynamic cant sensor or vertical angle sensor of the invention has the advantages that a gyro unit is not required, that it operates on a single axis, it utilizes substantially less power than a gyro system and a filtered roll rate signal can be readily obtained as well as the filtered roll angle signal.

What is claimed is:

1. A vertical angle sensor for sensing the angular position of a structure along a plane comprising:

sensor mounting means fixedly mounted to said structure;

a gear train rotatably mounted to said sensor mounting means and including first and second gears having respective first and second shafts, said first shaft having an axis orthogonal to said plane, said first gear having a vertical reference axis orthogonal to the axis of said shaft thereof;

vertical angle sensor means mounted on said first gear at a pivot point externally radial to an axis of said first gear means along said reference axis and including pendulum means rotatably mounted at said pivot point and said pendulum having a vertical axis;

servo motor means coupled to said second shaft for rotating the gears in said gear train;

servo control means coupled between said vertical angle sensor means and said servo motor means; and resolver means including stator means fixedly mounted to said sensor mounting means and rotor means fixedly mounted to said first shaft, whereby upon said vertical sensor means sensing an angle of movement of said reference axis of first gear means relative to said vertical axis of said pendulum means, said servo control means controls said servo motor means to rotate said first gear so that said reference axis moves to the vertical position with said rotor means moving with said first gear means and said stator means providing a signal representative of the angle of movement.

2. The combination of claim 1 in which said vertical angle sensor means includes a first winding fixedly mounted to said first gear means and coupled to said servo control means and a second winding fixedly mounted to said pendulum.

3. The combination of claim 1 in which said servo control means includes low pass filter means.

4. The combination of claim 3 in which the rotor means includes at least one winding and said stator means includes at least one winding to provide an output signal as a function of the angle of said frame from the vertical.

5. The combination of claim 4 in which said servo control means includes a demodulator coupled between said vertical angle sensor and said low pass filter means and a modulator coupled between said low pass filter means and said servo motor means.

* * * * *